United States Patent Office 3,661,866
Patented May 9, 1972

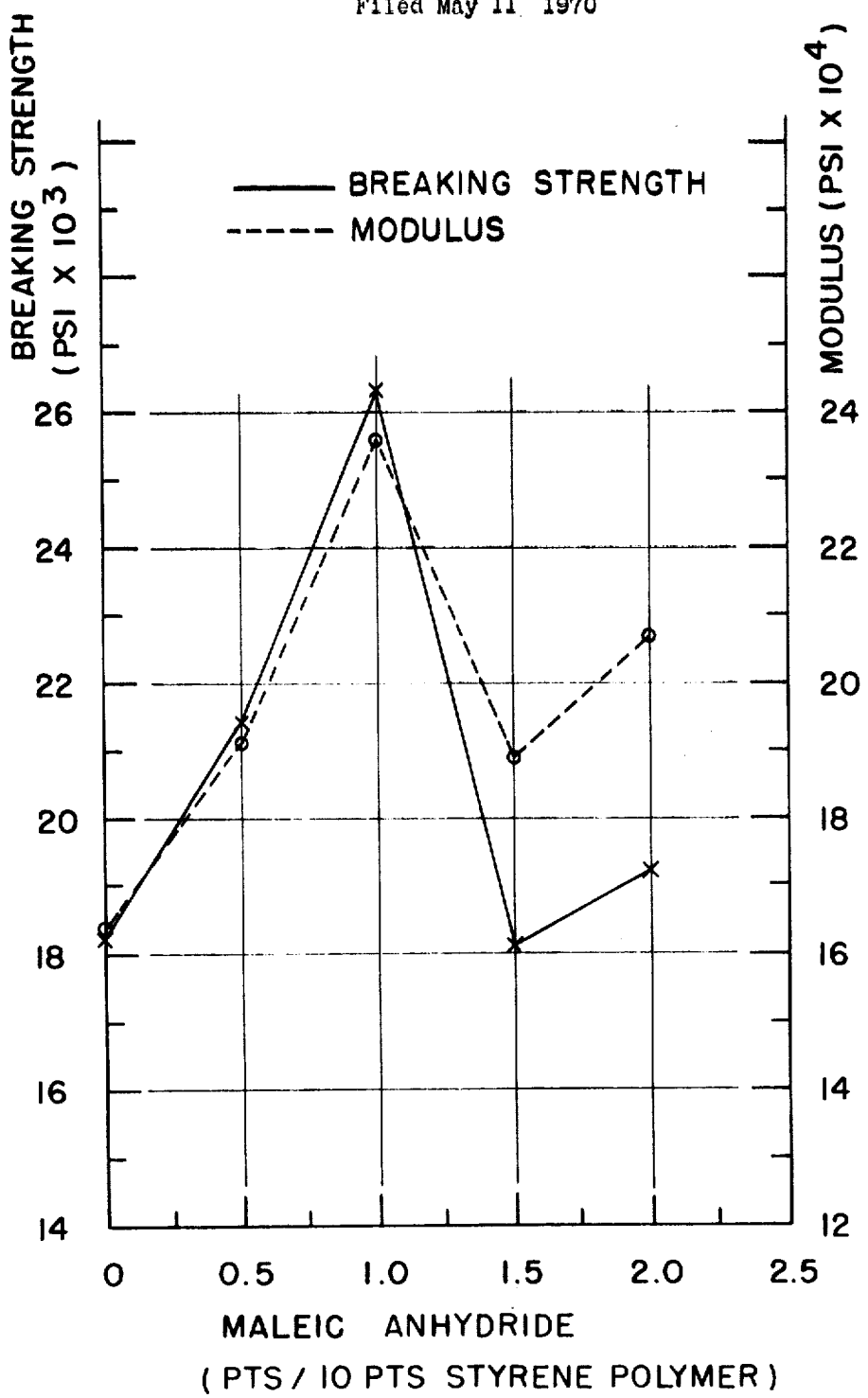

3,661,866
HIGH STRENGTH POLYSTYRENE
Eckhard C. A. Schwarz, Neenah, Wis., assignor to Kimberly-Clark Corporation, Neenah, Wis.
Filed May 11, 1970, Ser. No. 36,271
Int. Cl. C08f 27/00
U.S. Cl. 260—78.4 D                    10 Claims

ABSTRACT OF THE DISCLOSURE

Polystyrene of increased strength and resistance to thermal degradation is produced by reaction with maleic anhydride and a free radical former at elevated temperatures.

DESCRIPTION OF THE INVENTION

This application is directed to high strength polystyrene and the method whereby such high strength polystyrene may be obtained.

Earlier attempts to increase the strength of polystyrene involved the use of prolonged polymerization cycles during preparation of the polymer. In addition to extending the processing time, polymers produced in this manner often suffered the loss of desirable properties and degradation due to the high temperatures reached during processing.

It is a feature of this invention that such extended polymerization times may be avoided without sacrificing strength properties.

It is further an object of this invention to provide styrene polymers possessing an increased degree of resistance to thermal degradation during extrusion.

A still further object of this invention is to provide styrene polymers requiring less power and cost to process since a lower molecular weight raw material may be used.

The styrene polymers of this invention may be used wherever styrene and its copolymers find utility and are especially useful where a sheet or film is desired that possesses greater strength than that usually attributed to styrene polymers. Examples of such uses include rigid shaped articles such as toys, trays, and high modulus films for envelope windows.

The sole figure describes in graphical form results obtainable through the use of the present invention. Two of the strength parameters of Table I have been plotted and compared with a commercial styrene polymer which is represented by points on the left vertical axis at zero parts maleic anhydride.

In accordance with the present invention, the polystyrene resin is reacted, prior to processing by film extrusion or other means, with maleic anhydride and a free radical former. In a preferred mode this reaction is carried out at an elevated temperature of from 180° to 250° C. Films formed from polymers of this invention are stronger than polystyrene lacking the additives.

In the context of the present invention, the term "free radical former" is defined as follows: An organic compound which undergoes homolytic cleavage as a result of thermal treatment, resulting in two or more species each having one or more unpaired electrons.

Examples of suitable free radical formers include dibenzoyl peroxide, oxygen and $\alpha,\alpha'$-azodiisobutyronitrile.

While it is not intended that this invention be limited to any particular theory, it is believed that the polystyrene undergoes an addition reaction followed by chain rearrangement. This results in an increase in the molecular weight and strength parameters of the resulting styrene polymer product. The reaction of this invention takes place between styrene polymer and maleic anhydride and is to be distinguished from the copolymerization of the two compounds which is well known.

As a means of illustrating the present invention, the following examples have been included. However, it is to be understood that the invention is not to be limited thereto and may be variously embodied within the scope of the appended claims.

EXAMPLE I

Example I illustrates the effect of the present invention upon selected strength parameters of polystyrene. A commercial sample of linear polystyrene (Dow Chemical Co. "Styron 686") was dissolved in benzene at a concentration of 10% (10 grams polystyrene in 100 ml. solution). Maleic anhydride and dibenzoyl peroxide were added to 20 ml. samples of this solution in the weight ratios listed in Table I. Films were cast from each of the samples and the tensile properties of the films were measured with an "Instron" tensometer. The viscosity measurements were obtained in toluene at 25° C. and a concentration of 0.3 gram/100 ml. in a #50 Ostwald pipette (ASTM–D–445). The results of these tests appear in Table I below, where the numbers appearing in rows marked "a" relate to samples containing 0.1 gram dibenzoyl peroxide per 10 grams polystyrene while the results in rows marked "b" relate to samples containing no dibenzoyl peroxide. These results are further illustrated in part by the graph which forms the figure.

TABLE I

| Sample No | | 1 | 2 | 3 | 4 | 5 |
|---|---|---|---|---|---|---|
| Weight ratio polystyrene/maleic anhydride | | 10/0 | 10/0.5 | 10/1 | 10/1.5 | 10/2 |
| Breaking strength (p.s.i.) | a. | 18,200 | 21,400 | 26,300 | 18,100 | 19,200 |
| | b. | 18,500 | 17,500 | 15,400 | 14,000 | 12,500 |
| Modulus (p.s.i.) | a. | 164,000 | 191,000 | 236,000 | 188,000 | 207,000 |
| | b. | 175,000 | 180,000 | 155,000 | 140,000 | 111,000 |
| Percent elongation at break | a. | 11.7 | 12.1 | 12.2 | 11.6 | 10.5 |
| | b. | 12.1 | 15.4 | 16.0 | 14.5 | 14.8 |
| Reduced specific viscosity (100 cm.³ at 0.3 g./100 cm.³) | a. | 0.94 | | 1.35 | | |
| | b. | 0.92 | | 0.85 | | |

From Table I and the figure it may be seen that the breaking strength of polystyrene may be increased from 18,500 to 26,300 or 44% through the use of the present invention. Similarly the modulus may be increased from 164,000 p.s.i. to 236,000 p.s.i., or 64%. The effect of maleic anhydride on percent elongation at break appears to be offset by the dibenzoyl peroxide so that this factor shows only slight variation when both additives are used. Reduced specific viscosity results are increased from 0.94 to 1.35 through the use of both components but decreased slightly without the benzoyl peroxide.

From Table I it can be seen that beneficial results are obtained from the use of maleic anhydride in any significant amount up to about 2 parts by weight per 10 parts of styrene polymer. Thus the range of 0.1 to 2.0 parts per 10 parts of styrene polymer is preferred. The useful range of free radical former is 0.1 to 5 moles per 100 moles of styrene based on the monomer unit of styrene.

EXAMPLE II

Example II demonstrates that air can provide an effect similar to that resulting from the use of dibenzoyl peroxide. Samples were prepared in the same manner as 1b and 3b of Example I. The resulting films were subsequently heated in an oven exposed to air at 145° C. for 15 minutes. This procedure was repeated using nitrogen gas instead of air. The results of the tests conducted are presented in Table II.

TABLE II

| | Corresponding Table I Sample No. | | | |
|---|---|---|---|---|
| | 1b in— | | 3b in— | |
| | Air | Nitrogen | Air | Nitrogen |
| Breaking strength (p.s.i.) | 18,500 | 18,550 | 27,000 | 19,500 |
| Modulus (p.s.i.) | 170,000 | 169,000 | 229,000 | 185,000 |
| Percent elongation at break | 12.1 | 11.8 | 12.7 | 11.9 |
| Viscosity (As in Example I) | 0.92 | 0.90 | 1.38 | 0.79 |

The data in Table II shows that using air instead of dibenzoyl peroxide as a free radical former is slightly less effective although increases in breaking strength and modulus are still substantial at 46% and 35%, respectively. The corresponding increases for the samples utilizing nitrogen are 5.1% and 9.5% respectively with the reduced specific viscosity actually decreasing indicating that the higher molecular weight is not achieved using nitrogen alone. Therefore, the free radical former component of air is believed to be oxygen.

EXAMPLE III

Example III illustrates the effect of increased temperature on the strength properties of polystyrene. Sample 1 contained no maleic anhydride or dibenzoyl peroxide while sample 2 had a ratio of polystyrene to maleic acid of 10/1 and 0.1% of dibenzoyl peroxide. Both samples were extruded in a ½ inch Brabender extruder through a 4 inch film die. The film was cast on a chill roll while the extruder temperature was kept at 275° C. and the transfer rate of polymer was adjusted to give a five minute hold-up time of the polymer in the extruder. The results of tests performed on these samples appear in Table III.

TABLE III

| Sample | 1 | 2 |
|---|---|---|
| Breaking strength (p.s.i.) | 4,800 | 8,000 |
| Modulus (p.s.i.) | 128,000 | 290,000 |
| Percent elongation at break | 10.5 | 8.9 |

From the above it can be seen that the breaking strength of both samples was reduced substantially while the modulus of the sample containing maleic anhydride and dibenzoyl peroxide was increased to 290,000 p.s.i. The use of temperature control therefore adds great flexibility in selecting the desired sheet or film properties. These figures further show the increased resistance to thermal degradation possessed by styrene polymers produced according to this invention.

EXAMPLE IV

Example IV demonstrates the applicability of this invention to a styrene/acrylonitrile copolymer having a molecular ratio of styrene to acrylonitrile of 3:1 (Dow Chemical Co. "Tyril 787"). Films were prepared and evaluated as set forth above. Tests performed on these samples are set forth in Table IV. Results in Row A after film pressing and in Row B after film pressing and heating in an air oven at 145° C. for 15 minutes. Sample 1 was "Tyril 787" and sample 2 contained maleic anhydride in the amount of 1 part by weight per 10 parts of the copolymer.

TABLE IV

| Sample No. | | 1 | 2 |
|---|---|---|---|
| Reduced specific viscosity at 0.2 g./100 ml. in dimethyl formamide at 25° C., pipette No. 50. | A. | 1.02 | 0.84 |
| | B. | 0.98 | 1.29 |

Applicability of the invention is not to be limited to polymers of styrene alone, but clearly includes all copolymers containing a significant proportion of styrene.

As stated earlier, various free radical formers may be used in addition to dibenzoyl peroxide and air which were illustrated by the examples. The improved results of the invention are not dependent upon the use of any particular free radical former. However, the preferred free radical formers are dibenzoyl peroxide, dicumyl peroxide, oxygen, and $\alpha,\alpha$-azodiisobutyronitrile.

The particular temperature at which the reaction between the styrene polymer, maleic anhydride, and free radical former takes place depends upon the properties desired in the finished product. However, the range of 180° C. to 250° C. may be used with a preferred temperature of about 200° C. for maximum strength properties.

While the invention has been described with reference to specific examples, it is not to be limited thereto. In its broadest aspects the invention may be variously embodied within the scope of the appended claims.

What is claimed is:

1. The reaction product of styrene polymer, 0.1 to 2.0 parts by weight maleic anhydride per 10 parts styrene polymer, and 0.1 to 5.0 moles of a free radical former per mole of styrene based on the monomer unit of styrene.

2. The reaction product of claim 1 wherein the free radical former is selected from a group consisting of dibenzoyl peroxide, oxygen, dicumyl peroxide and $\alpha,\alpha$-azodiisobutyronitrile.

3. The composition of claim 1 wherein the free radical former is dibenzoyl peroxide which has been added in the amount of 0.1 gram dibenzoyl peroxide per 10 grams of polystyrene.

4. The composition of claim 3 wherein the ratio of polystyrene to maleic anhydride is about 10 to 1.

5. A method of imparting increased strength properties to styrene polymers comprising the step of reacting said styrene polymer with maleic anhydride and a free radical former.

6. The method of claim 5 wherein said free radical former is selected from the group consisting of dibenzoyl peroxide, oxygen, dicumyl peroxide, and $\alpha,\alpha$-azodiisobutyronitrile.

7. The method of claim 5 wherein said reaction is carried out at an elevated temperature in the range of 180° to 250° prior to extrusion.

8. The method of claim 7 wherein said elevated temperature is about 200° C.

9. The method of claim 5 wherein said free radical former is dibenzoyl peroxide and is added in the amount of about 0.1 gram dibenzoyl peroxide per 10 grams of polystyrene.

10. The method of claim 9 wherein the maleic anhydride is added in the amount of about 10 parts polystyrene to 1 part maleic anhydride.

References Cited
UNITED STATES PATENTS

| 3,214,416 | 10/1965 | Waack | 260—78.4 |
| 2,973,344 | 2/1961 | Fasce | 260—78.4 |
| 3,567,691 | 3/1971 | Van Breen et al. | 260—78.4 |
| 3,433,777 | 3/1969 | Brunson | 260—88.2 |

JOSEPH L. SCHOFER, Primary Examiner

J. KIGHT III, Assistant Examiner

U.S. Cl. X.R.

260—93.5 A